(12) United States Patent
Lee et al.

(10) Patent No.: US 8,697,286 B2
(45) Date of Patent: Apr. 15, 2014

(54) ANODE ACTIVE MATERIAL, ANODE INCLUDING THE ANODE ACTIVE MATERIAL, METHOD OF MANUFACTURING THE ANODE, AND LITHIUM BATTERY INCLUDING THE ANODE

(75) Inventors: Jeong-hee Lee, Seongnam-si (KR); Ho-suk Kang, Seoul (KR); Jeong-na Heo, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 537 days.

(21) Appl. No.: 12/572,474

(22) Filed: Oct. 2, 2009

(65) Prior Publication Data

US 2010/0136431 A1    Jun. 3, 2010

(30) Foreign Application Priority Data

Dec. 2, 2008   (KR) .................. 10-2008-0120863

(51) Int. Cl.
*H01M 4/13* (2010.01)
(52) U.S. Cl.
USPC ............. 429/231.8; 429/209; 429/231.4; 429/232
(58) Field of Classification Search
CPC ..... H01M 4/386; H01M 4/622; H01M 4/623; H01M 4/625
USPC ............. 429/209, 231.4, 231.8, 232
See application file for complete search history.

(56) References Cited

U.S. PATENT DOCUMENTS

2008/0261116 A1 * 10/2008 Burton et al. ............. 429/231.8

FOREIGN PATENT DOCUMENTS

| JP | 2003-109597 | 4/2003 |
|---|---|---|
| JP | 2004-220911 | 8/2004 |
| KR | 10-2004-0025091 | 3/2004 |
| KR | 10-2004-0025095 | 3/2004 |
| KR | 10-2005-0047242 | 5/2005 |
| KR | 10-2005-0111755 | 11/2005 |

OTHER PUBLICATIONS

Patent Abstract of Japan, Computer English translation of JP 2004220911, 2012.*
Beattie et al. "Si Electrodes for Li-Ion Batteries—A New Way to Look at an Old Problem", Journal of The Electrochemical Society, 155 (2) A158-A163 (2008).
Carner et al. "Nano-Si/Cellulose Composites as Anode Materials for Lithium-Ion Batteries", Electrochemical and Solid-State Letters, 11 (6) A101-A104 (2008).
Hochgatterer et al. "Silicon/Graphite Composite Electrodes for High-Capacity Anodes: Influence of Binder Chemistry on Cycling Stability", Electrochemical and Solid-State Letters, 11 (5) A76-A80 (2008).
Lestriez et al. "On the binding mechanism of CMC in Si negative electrodes for Li-ion batteries", Electrochemistry Communications 9 (2007) 2801-2806.
Li et al. "Sodium Carboxymethyl Cellulose: A Potential Binder for Si Negative Electrodes for Li-Ion Batteries", Electrochemical and Solid-State Letters, 10 (2) A17-A20 (2007).

* cited by examiner

*Primary Examiner* — Jane Rhee
(74) *Attorney, Agent, or Firm* — Cantor Colburn LLP

(57) ABSTRACT

An anode active material for lithium batteries, an anode including the anode active material, a method of manufacturing the anode, and a lithium battery including the anode. The anode active material includes secondary particles formed of agglomerated primary nanoparticles. The primary nanoparticles include a non-carbonaceous material bound with hollow carbon nanofibers. The anode includes the anode active material and a polymeric binder having an electron donor group.

22 Claims, 13 Drawing Sheets

ANODE ACTIVE MATERIAL, ANODE INCLUDING THE ANODE ACTIVE MATERIAL, METHOD OF MANUFACTURING THE ANODE, AND LITHIUM BATTERY INCLUDING THE ANODE

CROSS-REFERENCE TO RELATED APPLICATION

This application claims the benefit of Korean Patent Application No. 10-2008-0120863, filed on Dec. 2, 2008, in the Korean Intellectual Property Office, the disclosure of which is incorporated herein, by reference.

BACKGROUND

1. Field

The present teachings relate to an anode active material, an anode including the anode active material, a method of manufacturing the anode, and a lithium battery including the anode.

2. Description of the Related Art

Lithium batteries are widely used as a power source for portable electronic devices. Lithium batteries use an organic electrolyte and have twice the discharge voltage of a conventional alkali battery. Accordingly, lithium batteries also have a higher energy density.

As anode active materials for lithium batteries, lithium-transition metal oxides, such as $LiCoO_2$, $LiMn_2O_4$, $LiNi_{1-x}Co_xO_2$ ($0 \leq x \leq 1$), which have a structure that allows for the reversible intercalation of lithium ions, are mainly used. Carbonaceous materials in various forms, such as artificial graphite, natural graphite, and hard carbon, which allow for the reversible intercalation of lithium ions, have also been used as anode active materials. However, due to poor stability and capacity reductions, which occur with the use of these carbonaceous materials, non-carbonaceous materials, such as silicon (Si), are being studied for use as anode active materials.

Such non-carbonaceous materials exhibit a capacity that is at least ten times that of graphite. However, the cycle lifetime characteristics thereof deteriorate, due to volumetric changes that occur during charging and discharging. In addition, non-carbonaceous active materials, such as Si, have a low electrical conductivity and obstruct the flow of electrons, thereby lowering cell performance.

In order to address the problem of poor cycle lifetime characteristics, which occur as the non-carbonaceous materials are fractured due to the volumetric changes, and/or other problems, research is currently being conducted into a binder that can enhance the integrity of a anode active material. The use of carboxymethyl cellulose (CMC)-based binders, instead of a conventional polyvinylidene fluoride binder, has been reported (Electrochem. Commun. 9, 2801 (2007), Electrochem. Solid-state Lett. 10, A17 (2007), Electrochem. Solid-state Lett. 11, A76 (2008), Electrochem. Solid-state Lett. 11, A101 (2008), J. Electrochem. Soc. 155, A158 (2008)).

CMC-based binders are known to improve the cycle lifetime characteristics of non-carbonaceous anode active materials. However, along with an increasing demand for improved cycle lifetime characteristics, research is continuing into a binder that can further improve the cycle lifetime characteristics of anode active materials.

SUMMARY

One or more embodiments include an anode active material exhibiting improved cycle lifetime characteristics.

One or more embodiments include an anode including the anode active material.

One or more embodiments include a method of manufacturing the anode.

One or more embodiments include a lithium battery including the anode.

One or more embodiments may include an anode active material comprising secondary particles that include agglomerated primary nanoparticles, wherein the primary nanoparticles include a non-carbonaceous material that is bound to hollow carbon nanofibers.

One or more embodiments may include an anode comprising a current collector and an active material layer formed on the current collector. The active material layer comprises a polymeric binder having an electron donor group and an anode active material including secondary particles that include agglomerated primary nanoparticles. The primary nanoparticles include a non-carbonaceous material that is bound to hollow carbon nanofibers.

One or more embodiments may include a method of manufacturing an anode, the method comprising: milling a non-carbonaceous material and hollow carbon nanofibers in an organic solvent; drying the mixture to prepare an anode active material including secondary particles comprising agglomerated primary nanoparticles, in which the non-carbonaceous material is bound to the hollow carbon nanofibers; mixing the anode active material, a binder, and a solvent to prepare an anode active material composition; coating the anode active material composition on a current collector; and drying the coated anode active material composition to complete the anode.

One or more embodiments may include a lithium battery comprising: the anode; a cathode including a cathode active material; and an electrolyte.

According to various embodiments, the non-carbonaceous material can be selected from the group consisting of silicon (Si), a silicon oxide (($SiO_x$) where $0<x<2$)), Si—Y, and a mixture thereof. Y may be As, Sb, Bi, Cu, Ni, Mg, In, Zn, Ag, Al, or a combination thereof.

According to various embodiments, the average particle size of the non-carbonaceous material is in a range of about 10 to about 50 nm.

According to various embodiments, the hollow carbon nanofibers may be carbon nanotubes.

Additional aspects and/or advantages of the present teachings will be set forth in part in the description which follows and, in part, will be obvious from the description, or may be learned by practice of the invention.

BRIEF DESCRIPTION OF THE DRAWINGS

These and/or other aspects will become apparent and more readily appreciated from the following description of the exemplary embodiments, taken in conjunction with the accompanying drawings, of which.

DETAILED DESCRIPTION

Figure 1:
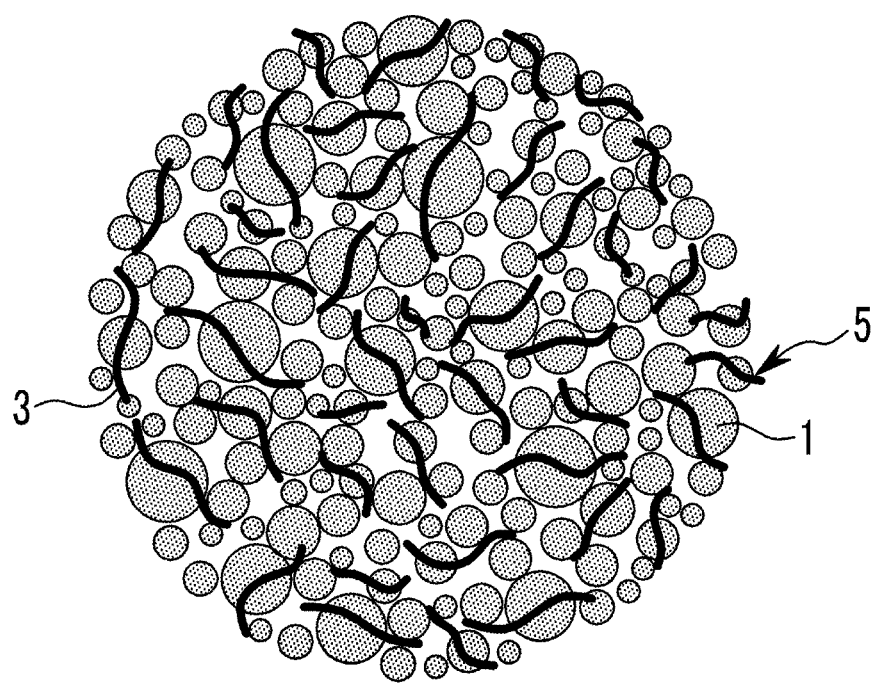
FIG. 1 is a schematic view of the structure of an anode active material, according to an exemplary embodiment of the present teachings.

Reference will now be made in detail to the exemplary embodiments of the present teachings, examples of which are illustrated in the accompanying drawings, wherein like reference numerals refer to the like elements throughout. In this regard, the present teachings should not be construed as being limited to the exemplary embodiments set forth herein. Accordingly, the exemplary embodiments are described below, by referring to the figures, in order to explain various aspects of the present teachings.

One or more embodiments include an anode active material including a non-carbonaceous material. The anode active material includes secondary particles that are formed by agglomerating primary nanoparticles. The primary nanoparticles include the non-carbonaceous material and hollow carbon nanofibers, which are bound to the non-carbonaceous material by Van der Waals forces.

An anode active material 10, according to an exemplary embodiment of the present teachings, will be described with reference to FIG. 1. Referring to FIG. 1, the anode active material 10 includes secondary particles that are formed by the agglomeration of primary nanoparticles 5. The primary nanoparticles 5 include a non-carbonaceous material 1 and hollow carbon nanofibers 3, which are bound to the non-carbonaceous material by Van der Waals forces.

The non-carbonaceous material may be a silicon-based material, such as silicon (Si), a silicon oxide ($SiO_x$, where $0<x<2$), Si—Y, or a mixture thereof. Herein, Y may be As, Sb, Bi, Cu, Ni, Mg, In, Zn, Ag, Al, or a combination thereof. When the silicon-base material can be more readily formed into nanoparticles using a bead mill or a ball mill, as compared to malleable tin (Sn) or an Sn alloy.

Such non-carbonaceous materials exhibit a higher capacity, but a lower electrical conductivity, than conventional carbonaceous anode active materials. Thus, the non-carbonaceous materials may reduce cell performance, when used alone.

In the anode active material 10, the non-carbonaceous material 1 is bound to the hollow carbon nanofibers 3 to form a composite material. Thus, the anode active material 10 can have a higher electrical conductivity.

The non-carbonaceous material 1 may have an average particle size in a range of about 10 to about 50 nm, for example, about 10 to about 30 nm. If the non-carbonaceous material have a structure of non-spherical shape, the particle size may refer to the length of the particle in a shorter-axis direction. When the average particle size of the non-carbonaceous material 1 is within the above ranges, the non-carbonaceous material 1 can bind with the hollow carbon nanofibers 3, which provides excellent cycle lifetime characteristics. The average particle size of the primary nanoparticles is not limited to the above range, and may vary according to the dimensions of the non-carbonaceous material 1 and the hollow carbon nanofibers 3. Herein, the average particle size of the non-carbonaceous material can be taken as the average particle size of the primary nanoparticles, as the hollow carbon nanofibers do not significantly affect the average particle size.

In the anode active material 10, the secondary particles, which are agglomerated from the primary nanoparticles, may have a maximum average particle size of about 50 μm. If the secondary particles are larger than about 50 μm, the charge and discharge characteristics of the anode active material 10 may deteriorate at higher charge/discharge rates.

The hollow carbon nanofibers 3 may be, for example, carbon nanotubes. Examples of available carbon nanotubes may be single-wall nanotubes, multi-wall nanotubes, coiled nanotubes, or a combination thereof. The hollow carbon nanofibers 3 can bind with the electron donor groups of a binder more easily than solid carbon nanofibers, so that a structure of an anode can be better maintained.

Commercially available hollow carbon nanofibers may be used. Alternatively, hollow carbon nanofibers manufactured through a general manufacturing process, using a catalyst and a hydrocarbon gas may be used. The hollow carbon nanofibers 3 may have a diameter of about 1 to about 100 nm. The hollow carbon nanofibers 3 may have an aspect ratio of about 10 to about 10,000.

In the anode active material 10, a mixing ratio of the non-carbonaceous material 1 to the hollow carbon nanofibers 3 may be in a range of about 2:1 to about 50:1, by weight, and particularly, about 5:1 to about 10:1, by weight. If the proportion of the hollow carbon nanofibers 3 is too high, irreversible reactions may occur during charging and discharging. On the other hand, if the proportion of the hollow carbon nanofibers 3 is too low, satisfactory effects may not be attained.

Figure 2:
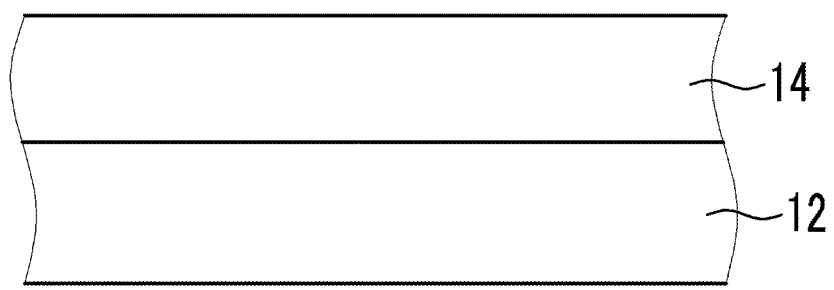
FIG. 2 is a schematic view of the structure of an anode, according to an exemplary embodiment of the present teachings.

FIG. 2 illustrates a schematic structure of an anode 20, according to an exemplary embodiment of the present teachings. The anode 20 includes a current collector 12 and an active material layer 14 formed on the current collector 12. The active material layer 14 includes the anode active material 10 and a polymeric binder having an electron donor group.

The amount of the hollow carbon nanofibers 3 may be in a range of about 2 to about 50%, by weight, based on the total weight of the active material layer 14. In particular, the amount of the hollow carbon nanofibers 3 may be in a range of about 5 to about 10%, by weight. If the amount of the hollow carbon nanofibers 3 is within the above ranges, it may result in a higher electrical conductivity, without a capacity reduction. The amounts of the anode active material 10 and the binder may be appropriately adjusted.

Figure 3:
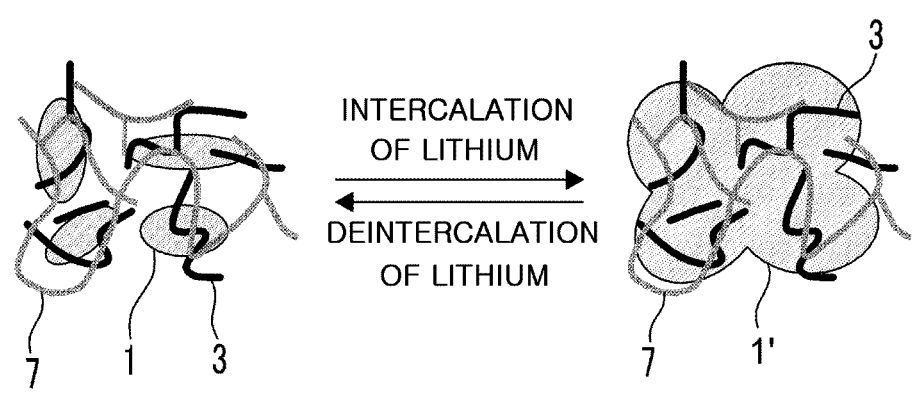
FIG. 3 is a schematic view illustrating that the structure of an active material layer of the anode is maintained during charging and discharging.

FIG. 3 shows the structure of the active material layer 14. In FIG. 3, reference numeral 7 denotes the binder. In addition, reference numeral 1' denotes a composite of Li and the non-carbonaceous material 1, which is generated during charging of the anode 20.

The binder includes a polymer having an electron donor group. The binder may be water-soluble. When a water-soluble binder is used, water may be used as a solvent, in the preparation of an anode active material composition. The use of water is environmentally friendly and may further simplify an anode manufacturing process.

The electron donor group aids the dispersal of the hollow carbon nanofibers 3 and provides electrons for holes of the hollow carbon nanofibers 3 (p-type), so that the hollow carbon nanofibers 3 can be bound with the binder 7, by charge transfer bonding. The charge transfer bonding enhances inter-particle cohesion in the anode 20. Thus, even if the volume of the non-carbonaceous material 1 changes, due to the intercalation/de-intercalation lithium, the structure of the anode active material 10 can be maintained, and electrical disconnections can be suppressed. Consequently, the cycle lifetime characteristics may be improved.

In the anode active material layer 14, the binder binds to the hollow carbon nanofibers 3, and the primary nanoparticles are also bound together by the binding force. Thus, the structure of the active material layer 14 can be maintained stably, thereby improving the cycle lifetime characteristics.

In addition, if a water-insoluble binder, such as polyvinidene fluoride (PVdF), and/or a rubber-based, water-insoluble binder, such as styrene-butadiene rubber (SBR), are used instead of, or in addition to, the polymeric binder 7, a suitable binding may not be obtained. This is because the water-insoluble binder and the rubber-based, water-soluble binder have no electron donor groups for binding to the hollow carbon nanofibers 3.

The electron donor group may be an amino group, an amide group, a thiol group, or a combination thereof. Examples of the binder 7 include polyethyleneimine, polyaniline, polythiophene, and a combination thereof.

The active material layer 14 may further include a conducting agent, in addition to the anode active material 10 and the binder 7. The conducting agent may be any conducting agent commonly used in lithium batteries. Examples of the conducting agent include: carbonaceous materials, such as natural graphite, artificial graphite, carbon black, acetylene black, ketchen black, carbon fibers, and the like; metal-based materials, such as copper, nickel, aluminum, silver, and the like (in powder or fiber form); and materials including conductive polymers, such as a polyphenylene derivative, and a mixture thereof. The amount of the conducting agent may be appropriately adjusted, according to an intended application.

The anode 20 includes the anode active material 20, and thus, exhibits improved electrical conductivity. The polymeric binder having an electron donor group may enhance the cohesion of anode 20, through the bonding with the hollow carbon nanofibers 3. Thus, as shown in FIG. 3, the structure of the active material layer 14 can be maintained during charging and discharging Thus, when the anode 20 is used, problems arising with conventional anodes including a non-carbonaceous material, such as Si, and/or other problems, can be solved. In other words, as the conventional anode is used, a Li—Si composite is formed, leading to abrupt volumetric changes in the crystalline lattice of Si, thereby fracturing the conventional active material. This leads to the disruption of an electron conduction network, causing a loss of electrical conduction. Therefore, the discharge capacity markedly decreases, as a result of repetitive charging and discharging.

Figure 4:
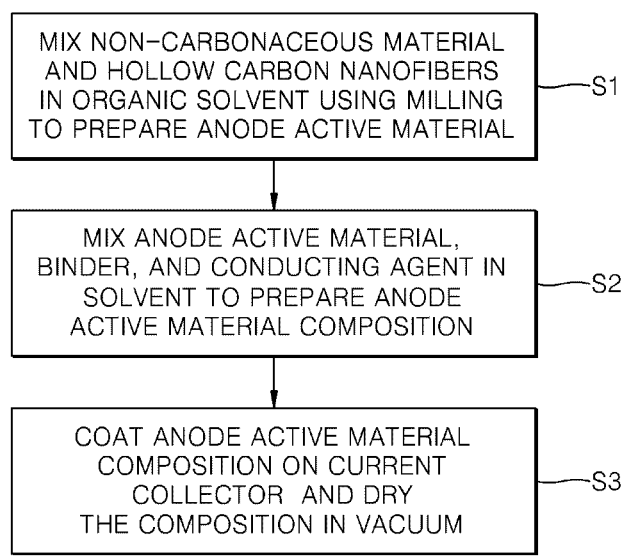
FIG. 4 is a flowchart of a method of manufacturing the anode, according to an exemplary embodiment of the present teachings.

A method of manufacturing the anode 20, according to an exemplary embodiment of the present teachings, will be described with reference to FIG. 4. Referring to FIG. 4, a non-carbonaceous material and hollow carbon nanofibers are mixed in an organic solvent, using a milling process. The resultant is then dried to prepare an anode active material (operation S1). The milling process may be bead milling or a ball milling.

The mixing process may be performed at a speed of about 50 to about 60 Hz, for about 1 to about 2 hours. When the speed and duration of the mixing process are within the above ranges, the average particle size of the non-carbonaceous material may be in a range of about 10 to about 50 nm. The resulting anode active material includes secondary particles that are formed by agglomerating primary nanoparticles. The temperature and duration of the drying process are not particularly limited. For example, the drying process may be performed at about 80° C., for about 24 hours.

The organic solvent may be a low-volatility solvent having a flash point of about 15° C., or higher. The organic solvent may be an alcohol or an alkane. In particular, the organic solvent may be a $C_1$ to $C_8$ alcohol, or a $C_6$ to $C_{12}$ alkane. Specific examples of the organic solvent may include, but be not limited to, ethanol, isopropanol, butanol, octanol, and the like. In the mixing process, the non-carbonadoes material and the hollow carbon nanofibers may be mixed in a ratio of about 2:1 to about 50:1, by weight, and particularly, about 5:1 to about 10:1, by weight.

As described above, as the anode active material is prepared, the non-carbonaceous material is pulverized into nanoparticles, which bind with the hollow carbon nanofibers, thus forming the primary nanoparticles. Thus, when the polymeric binder binds to the hollow carbon nanofibers, the primary nanoparticles are strongly bound together, so that the structure of the anode active material can be maintained.

Next, the anode active material and the polymeric binder are mixed in a solvent, to prepare an anode active material composition (operation S2). Water may be used as the solvent. A conducting agent may be optionally added during the mixing process. The amounts of the binder and the conducting agent may be appropriately adjusted and are not particularly limited. However, the amount of the hollow carbon nanofibers may be in a range of about 2 to about 20%, by weight, and particularly, about 5 to about 10%, by weight, based on the total weight of the anode active material composition, excluding the solvent.

The anode active material composition is coated on a current collector and dried, to manufacture an anode (operation S3). The current collector may be any one selected from the group consisting of a copper foil, a nickel foil, a stainless steel foil, a titanium foil, a nickel foam, a copper foam, and a polymeric substrate coated with a conductive metal. Alternatively, the current collector may be manufactured from a mixture of the materials listed above, or by stacking substrates made from the materials.

The mixing process may be performed at a temperature ranging from about 100 to about 200° C., so as to completely evaporate the solvent. The drying process may be performed under vacuum conditions. The drying process may be performed for about 2 hours, or longer, and particularly, for from about 1 to about 12 hours. If the drying temperature and duration are within the above ranges, the anode is not degraded, and the solvent is suitably removed, thereby increasing a reversible efficiency during charging and discharging.

Figure 5:
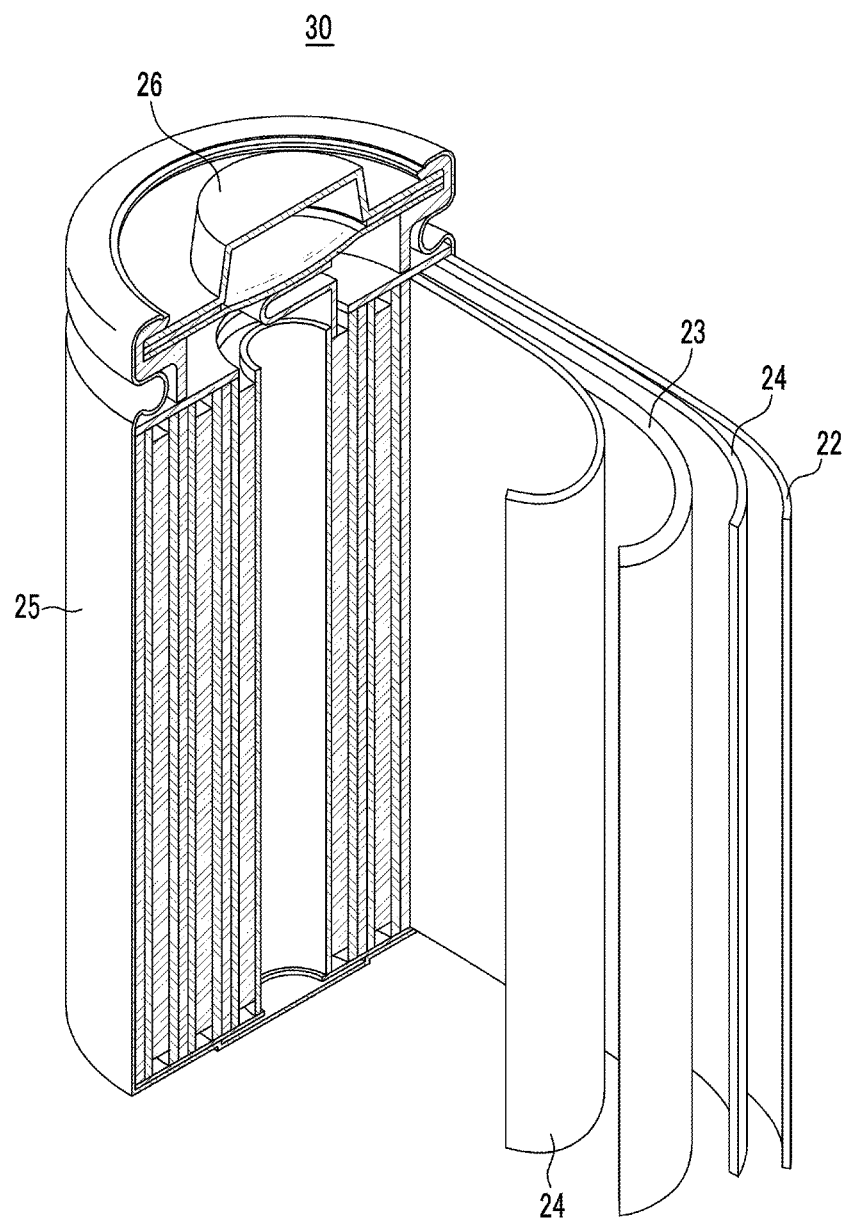
FIG. 5 is a schematic view of the structure of a lithium battery, according to an exemplary embodiment of the present teachings.

FIG. 5 is a schematic view of a typical structure of a lithium battery 30, according to an exemplary embodiment of the present teachings. Referring to FIG. 5, the lithium battery 30 includes a cathode 23, an anode 22, a separator 24 disposed between the cathode 23 and the anode 22, an electrolyte (not shown), a battery container 25, and a sealing member 26 for sealing the battery container 25. Specifically, the cathode 23, the separator 24, and the anode 22 are sequentially stacked and then wound in a cylindrical shape, impregnated with the electrolyte, and inserted into the battery container 25, thereby completing the manufacture of the lithium secondary battery 30.

The cathode 23 includes a current collector and a cathode active material layer formed on the current collector. The cathode active material layer includes a cathode active material that can reversibly intercalate lithium. In particular, the cathode active material may be a composite oxide of lithium and a metal selected from the group consisting of cobalt, manganese, nickel, and a combination thereof.

Specific examples of the cathode active material may include compounds represented by the following formulae: $Li_aA_{1-b}X_bD_2$ where $0.95 \le a \le 1.1$ and $0 \le b \le 0.5$; $Li_aE_{1-b}X_bO_{2-c}D_c$, where $0.95 \le a \le 1.1$, $0 \le b \le 0.5$, and $0 \le c \le 0.05$; $LiE_{2-b}X_bO_{4-c}D_c$, where $0 \le b \le 0.5$, and $0 \le c \le 0.05$; $Li_aNi_{1-b-c}Co_bBcD_\alpha$, where $0.95 \le a \le 1.1$, $0 \le b \le 0.5$, $0 \le c \le 0.05$, and $0 < \alpha \le 2$; $Li_aNi_{1-b-c}Co_bX_cO_{2-\alpha}M_\alpha$, where $0.95 \le a \le 1.1$, $0 \le b \le 0.5$, $0 \le c \le 0.05$, and $0 < \alpha < 2$; $Li_aNi_{1-b-c}CO_bX_cO_2\ _{-\alpha}M_2$, where $0.95 \le a \le 1.1$, $0 \le b \le 0.5$, $0 \le c \le 0.05$, and $0 < \alpha < 2$; $Li_aNi_{1-b-c}Mn_bX_cD_\alpha$, where $0.95 \le a \le 1.1$, $0 \le b \le 0.5$, $0 \le c \le 0.05$, and $0 < \alpha \le 2$; $Li_aNi_{1-b-c}Mn_bX_cO_{2-\alpha}M_\alpha$, where $0.95 \le a \le 1.1$, $0 \le b \le 0.5$, $0 \le c \le 0.05$, and $0 < \alpha < 2$; $Li_aNi_{1-b-c}Mn_bX_cO_{2-\alpha}M_2$, where $0.95 \le a \le 1.1$, $0 \le b \le 0.5$, $0 \le c \le 0.05$, and $0 < \alpha < 2$; $Li_aNi_bE_cG_dO_2$, where $0.90 \le a \le 1.1$, $0 \le b \le 0.9$, $0 \le c \le 0.5$, and $0.001 \le d \le 0.1$; $Li_aNi_bCO_cMn_dG_eO_2$, where $0.90 \le a \le 1.1$, $0 \le b \le 0.9$, $0 \le c \le 0.5$, $0 \le d \le 0.5$, and $0.001 \le e \le 0.1$; $Li_aNiG_bO_2$, where $0.90 \le a \le 1.1$ and $0.001 \le b \le 0.1$; $Li_aCoG_bO_2$, where $0.90 \le a \le 1.1$, and $0.001 \le b \le 0.1$; $Li_aMnG_bO_2$ where $0.90 \le a \le 1.1$, and $0.001 \le b \le 0.1$; $Li_aMn_2G_bO_4$, where $0.90 \le a \le 1.1$, and $0.001 \le b \le 0.1$; $QO_2$; $QS_2$; $LiQS_2$; $V_2O_5$; $LiV_2O_5$; $LiZO_2$; $LiNiVO_4$; $Li_{(3-f)}J_2(PO_4)_3 (0 \le f \le 2)$; $Li_{(3-f)}Fe_2(PO_4)_3 (0 \le f \le 2)$; and $LiFePO_4$.

In the formulae listed above: A is selected from the group consisting of Ni, Co, Mn, and a combination thereof; X is selected from the group consisting of Al, Ni, Co, Mn, Cr, Fe, Mg, Sr, V, a rare earth element, and a combination thereof; D is selected from the group consisting of O, F, S, P, and a combination thereof; E is selected from the group consisting of Co, Mn, and a combination thereof; M is selected from the group consisting of F, S, P, and a combination thereof; G is selected from the group consisting of Al, Cr, Mn, Fe, Mg, La, Ce, Sr, V, and a combination thereof; Q is selected from the group consisting of Ti, Mo, Mn, and a combination thereof; Z is selected from the group consisting of Cr, V, Fe, Sc, Y, and a combination thereof; and J is selected from the group consisting of V, Cr, Mn, Co, Ni, Cu, and a combination thereof.

These compounds may have a surface coating layer (hereinafter, "coating layer"). Alternatively, a mixture of the coated and uncoated compounds may be used. The coating layer may include at least one coating element selected from the group consisting of Mg, Al, Co, K, Na, Ca, Si, Ti, V, Sn, Ge, Ga, B, As, Zr, Ag, Al, or a combination thereof. The coating element may be in the form of an oxide, a hydroxide, an oxyhydroxide, an oxycarbonate, or a hydroxycarbonate. The coating layer may be amorphous or crystalline.

A method of forming the coating layer may be any suitable method that does not adversely affect the physical properties of the anode active material. The coating method may be, for example, a spray coating method, an immersion method, and the like.

The cathode active material layer may further include a binder and a conducting agent. The binder binds together particles of the cathode active material and binds the cathode active material to the current collector. Specific examples of the binder may include polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, an epoxy resin, and nylon. However, the binder is not limited to these materials.

The conductive material increases the conductivity of the cathode electrode 23. The conductive material may be any conductive material that does not cause a chemical change when used in a battery. Examples of the conductive material include: a carbonaceous material, such as natural graphite, artificial graphite, carbon black, acetylene black, ketjen black, or carbon fiber; a metal such as copper, nickel, aluminum, or silver; a conductive polymer such as a polyphenylen derivative; and a mixture thereof. Herein, the metal may be in the form of a powder or a fiber. The current collector 12 may be formed of Al. However, the current collector 12 can also be formed of other materials.

The cathode is manufactured by mixing the cathode active material, the conducting agent, and the binder in a solvent, to prepare a cathode active material composition. The cathode active material composition is then coated on the current collector. The method of manufacturing the anode is obvious to those of skill in the art, and a detailed description thereof will be omitted. N-methylpyrrolidione may be used as the solvent, but not limited thereto.

The electrolyte includes a nonaqueous organic solvent and a lithium salt. The nonaqueous organic solvent serves as a medium for moving ions involved in electrochemical reactions the battery 30.

The non-aqueous organic solvent may be a carbonate-based solvent, an ester-based solvent, an ether-based solvent, a ketone-based solvent, an alcohol-based solvent, or an aprotic solvent. Examples of the carbonate-based solvent include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC). Examples of the ester-based solvent include methyl acetate, ethyl acetate, n-propyl acetate, dimethylacetate, methylpropionate, ethylpropionate, γ-butyrolactone, decanolide, valerolactone, mevalonolactone, and caprolactone. Examples of the ether-based solvent include dibutylether, tetraglyme, diglyme, dimethoxyethane, 2-methyltetrahydrofurane, and tetrahydrofurane. Examples of the ketone-based solvent include cyclohexanone. Examples of the alcohol-based solvent include ethylalcohol and isopropyl alcohol. Examples of the aprotic solvent include: nitriles such as R—CN, where R is a linear, branched, or cyclic C2 to C20 hydrocarbon group and has a double-bond direction ring or an ether bond; amides such as dimethylformamide; and dioxolane-based sulfolanes such as a 1,3-dioxolane sulfolane.

One of the nonaqueous organic solvents may be used. Alternatively, at least two of the nonaqueous organic solvents may be used in combination. In this case, a mixing ratio of the at least two of the nonaqueous organic solvents may be appropriately varied, according to the performance of the battery 30, which will be obvious to those of skill in the art.

The lithium salt is dissolved in the organic solvent and is a source of lithium ions in the battery 30, enabling the basic operation of the lithium battery 30. In addition, the lithium salt facilitates the migration of lithium ions between the cathode 23 and the anode 22. Examples of the lithium salt may include at least one supporting electrolyte salt selected from the group consisting of $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, Lil, and $LiB(C_2O_4)_2$ (LiBOB; lithium bis(oxalato) borate). The concentration of the lithium salt may be in a range of about 0.1 to about 2.0M. If the concentration of the lithium salt is within the above range, the electrolyte may have an appropriate conductivity and viscosity, and thus, may exhibit excellent performance, by allowing lithium ions to effectively migrate.

The separator 24 may be a monolayer, or a multilayer including at least two layers formed of polyethylene, polypropylene, or polyvinylidene fluoride. The multilayer may be a mixed multilayer. For example, the separator may be a two-layered separator including polyethylene and polypropylene layers, a three-layered separator including polyethylene, polypropylene, and polyethylene layers, a three-layered separator including polypropylene, polyethylene, and polypropylene layers.

Lithium batteries can be classified into lithium ion batteries, lithium ion polymer batteries and lithium polymer batteries, according to the types of separator and electrolyte included therein. Lithium batteries are also classified into cylindrical lithium batteries, rectangular lithium batteries, coin-like lithium batteries, and pouch-like lithium batteries, according to the shape thereof. Lithium batteries are further classified into bulky lithium batteries and thin lithium batteries, according to the size thereof. The lithium battery 30 can be a primary battery or a secondary battery.

The present teachings will now be described in greater detail with reference to the following examples. These examples are for illustrative purposes only and are not intended to limit the scope of the present teachings.

EXAMPLE 1

Silicon (Si) having an average particle diameter of 4 μm and carbon nanotubes were mixed in a mixing ratio of 90:10%, by weight, in ethanol, using a ball mill, and then dried to prepare an anode active material. Herein, the mixing process was performed at a speed of 55 Hz, for 1 hour. The drying process was performed at 85° C., for 24 hours. The carbon nanotubes had an average diameter of 1 nm and an aspect ratio of 1000 or greater.

The resulting anode active material included secondary particles that were formed by the agglomeration of primary nanoparticles including Si particles bound to the carbon nanotubes. Herein, the average particle size of the Si particles was 14 nm, as calculated using X-ray diffraction (XRD) and the Scherrer equation.

Next, the anode active material, artificial graphite as a conducting agent, and polyethyleneimine as a binder were mixed in water, to prepare an anode active material composition in slurry form. Herein, the proportions of the anode active material, the conducting agent and the binder were 55% (50% of Si and 5% of carbon nanotubes, by weight), 30%, and 15%, respectively, by weight, excluding the solvent.

The anode active material composition was coated on a copper current collector and dried at 120° C. in a vacuum, for 2 hours, to manufacture an anode.

EXAMPLE 2

An anode was manufactured in the same manner as in Example 1, except that no conducting agent was used, and the proportions of the anode active material and the binder were 85% by weight (76.5% by weight of Si and 8.5% by weight of carbon nanotubes) and 15% by weight, respectively, excluding the solvent.

COMPARATIVE EXAMPLE 1

An anode was manufactured in the same manner as in Example 1, except that polyvinylidene fluoride was used as the binder, instead of polyethyleneimine.

COMPARATIVE EXAMPLE 2

An anode was manufactured in the same manner as in Example 2, except that polyvinylidene fluoride was used as the binder, instead of polyethyleneimine.

COMPARATIVE EXAMPLE 3

A Si-anode active material was prepared by bead milling in ethanol, in the same manner as in Example 1, except that only Si having an average particle size of 4 μm, without carbon nanotubes, was used. The Si anode active material had an average particle size of 14 nm, which was similar to Example 1.

Next, the Si-anode active material, artificial graphite as a conducting agent, and polyvinylidene fluoride as a binder were mixed in N-methylpyrrolidone as a solvent, to prepare an anode active material composition in slurry form. Herein, the proportions of the anode active material, the conducting agent, and the binder were 50%, 35%, and 15%, respectively, by weight, excluding the solvent.

The anode active material composition was coated on a copper current collector and dried at 120° C. in a vacuum, for 2 hours, to manufacture an anode.

COMPARATIVE EXAMPLE 4

An anode was manufactured in the same manner as in Comparative Example 3, except that polyethyleneimine was used as the binder, instead of polyvinylidene fluoride.

1: Morphology Measurement

Figure 6:
FIG. 6 is a scanning electron microscope (SEM) image of an anode active material prepared in Example 1.

FIG. 6 is a scanning electron microscope (SEM) image (60,000× magnification) of the anode active material prepared according to Example 1. As shown in FIG. 6, Si primary nanoparticles were agglomerated into secondary particles.

Figure 7:
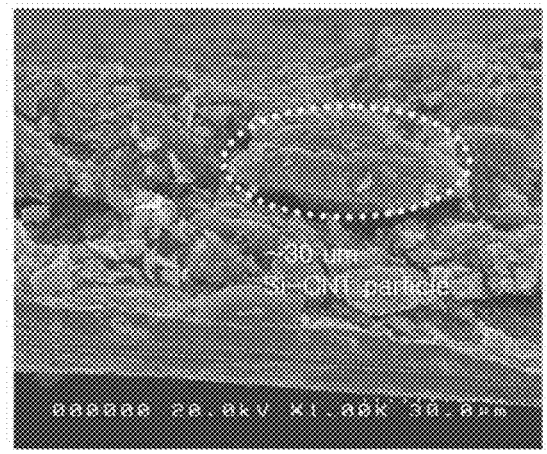
FIG. 7 is an SEM image (1,000× magnification) of the surface of an anode active material layer, of the anode manufactured according to Example 1.

FIG. 7 is a SEM image (1,000× magnification) of the surface of the anode active material layer, of the anode manufactured according to Example 1. In FIG. 7, secondary particles are delimited by circular, dotted lines. FIG. 7 shows that the anode active material layer of Example 1 had the secondary particles that were agglomerated from the primary nanoparticles.

2: Battery Characteristics Measurement

Coin-type half-cells were manufactured using the anodes manufactured according to Examples 1 and 2, and Comparative Examples 1 through 4, a lithium metal as a counter electrode, and an electrolyte. Herein, a solution of 1.3M LiPF$_6$ dissolved in a solvent of ethylene carbonate (EC) and diethylene carbonate (DEC), which were mixed in a 1:1 volumetric ratio, was used as the electrolyte.

2) Battery Characteristics

Figure 8:
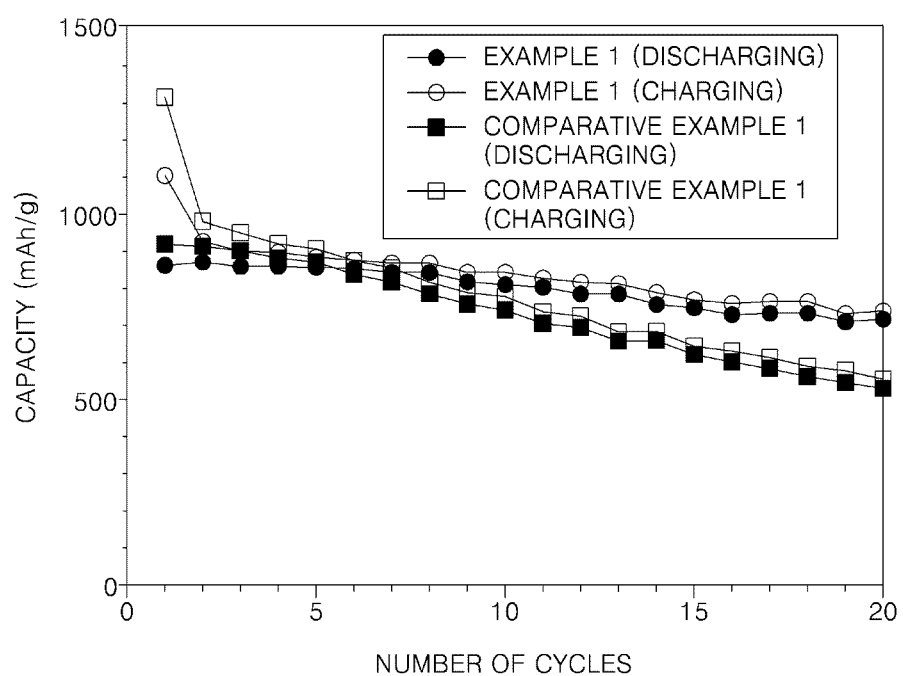
FIG. 8 is a graph of capacity with respect to charging/discharging cycles of half-cells including the anodes manufactured according to Example 1 or Comparative Example 1.
Figure 9:
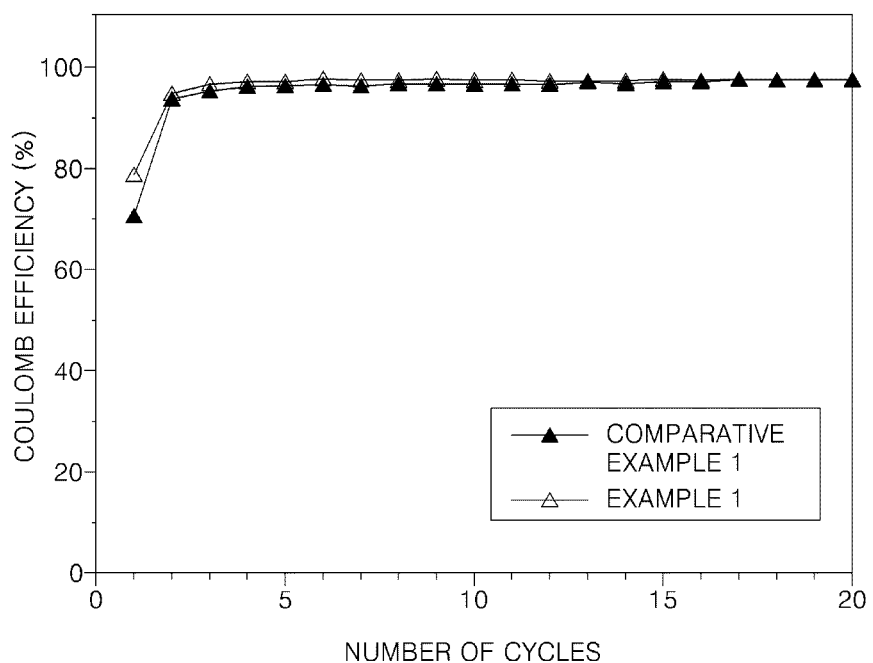
FIG. 9 is a graph of coulombic efficiency with respect to charging/discharging cycles of the half-cells including the anodes manufactured according to Example 1 and Comparative Example 1.

The half-cells respectively including the anodes of Example 1 and Comparative Example 1 were subjected to 20 cycles of charging and discharging, at 0.1 C, to measure the charge/discharge capacities according to the charging and discharging cycles. The results are shown in FIG. 8. In addition, the coulombic efficiency of each of the half-cells was measured, and the results are shown in FIG. 9. As shown in FIG. 9, the coulombic efficiency of the half-cell including the anode of Example 1 was greater than the coulombic efficiency of the half-cell including the anode of Comparative Example 1, at the initial cycle of charging and discharging. Thus, as shown in FIG. 8, the cycle lifetime characteristic of the half-cell including the anode of Example 1 was markedly better than the half-cell including the anode of Comparative Example 1.

Figure 10:
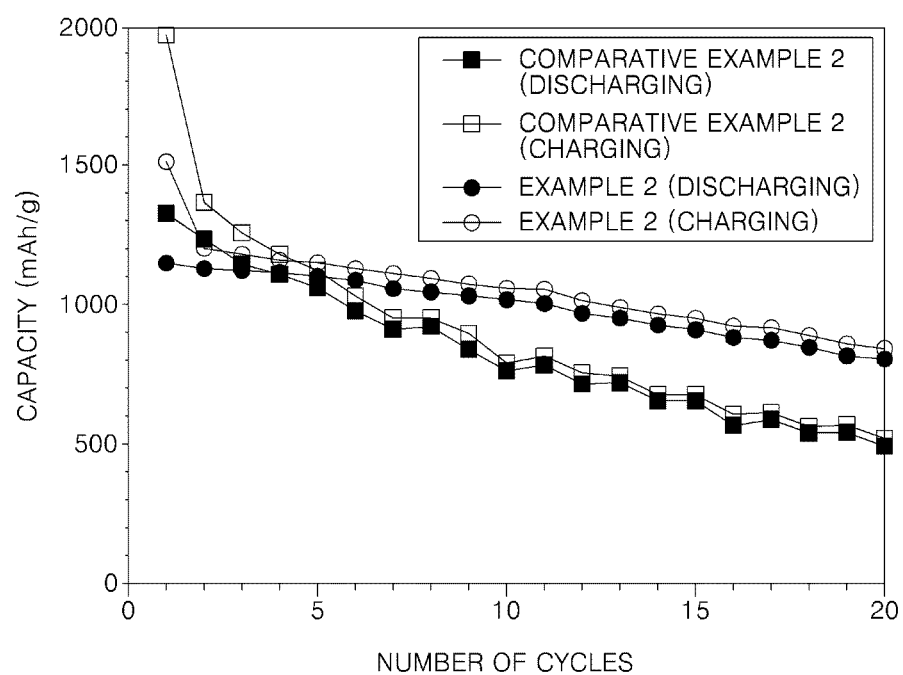
FIG. 10 is a graph of capacity with respect to charging/discharging cycles of half-cells including the anodes manufactured according to Example 2 or Comparative Example 2.
Figure 11:
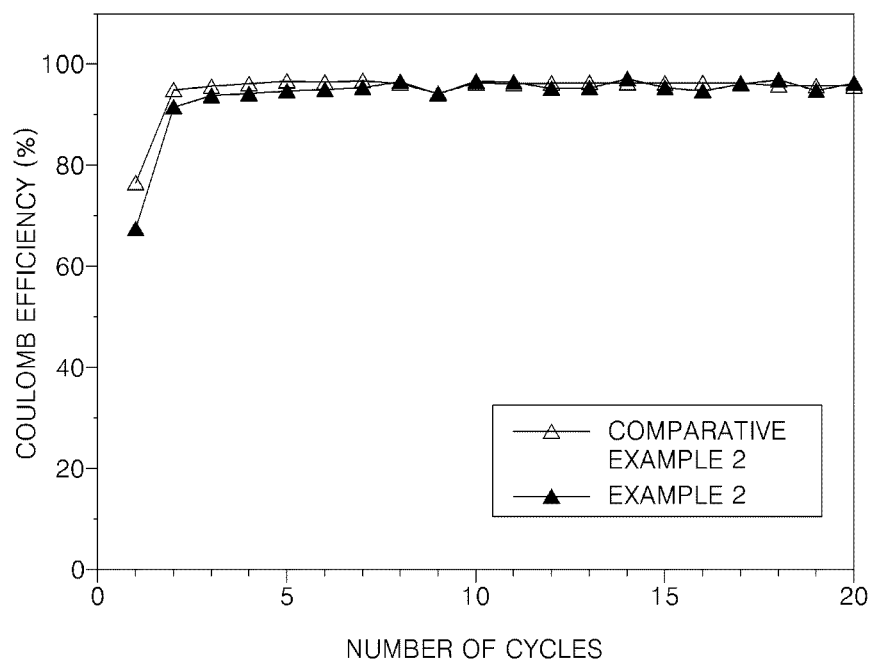
FIG. 11 is a graph of coulombic efficiency with respect to charging/discharging cycles of the half-cells including the anodes manufactured according to Example 2 and Comparative Example 2.

The half-cells respectively including the anodes of Example 2 and Comparative Example 2 were subjected to 20 cycles of charging and discharging, at 0.1 C, to measure charge and discharge capacities according to the charging and discharging cycles. The results are shown in FIG. 10. In addition, the coulombic efficiency of each of the half-cells was measured, and the results are shown in FIG. 11. As shown in FIG. 11, the coulombic efficiency of the half-cell including the anode of Example 2 was greater than the coulombic efficiency of the half-cell including the anode of Comparative Example 2, at the initial cycle of charging and discharging. Thus, as shown in FIG. 10, the cycle lifetime characteristic of the half-cell including the anode of Example 2 was markedly better than the half-cell including the anode of Comparative Example 2.

According to the results of FIGS. 8 through 11, when the anode active materials including of the secondary nanoparticles agglomerated from the primary Si nanoparticles, which are bound with the carbon nanotubes, and polyethyleneimine as the binder, are used, the cycle lifetime characteristics are improved, as compared to when polyvinylidene fluoride is used as the binder. This result is attributed to polyethyleneimine that binds to the carbon nanotubes, and thus, suppresses anode deformation during charging and discharging, thereby maintaining the electrical conducting path.

Figure 12:
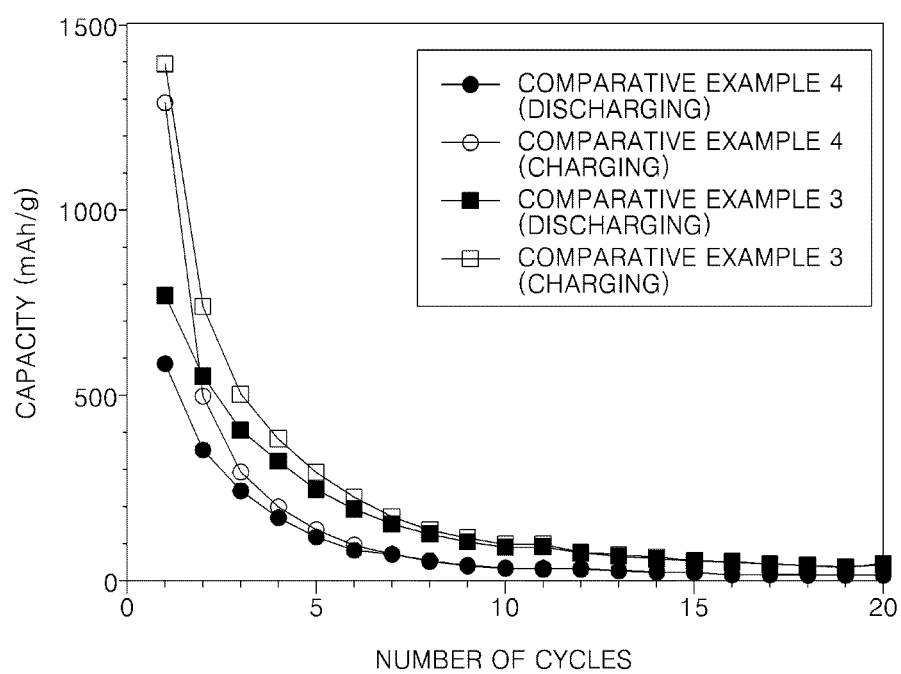
FIG. 12 is a graph of capacity with respect to charging/discharging cycles of half-cells including the anodes manufactured according to Comparative Examples 3 or 4.
Figure 13:
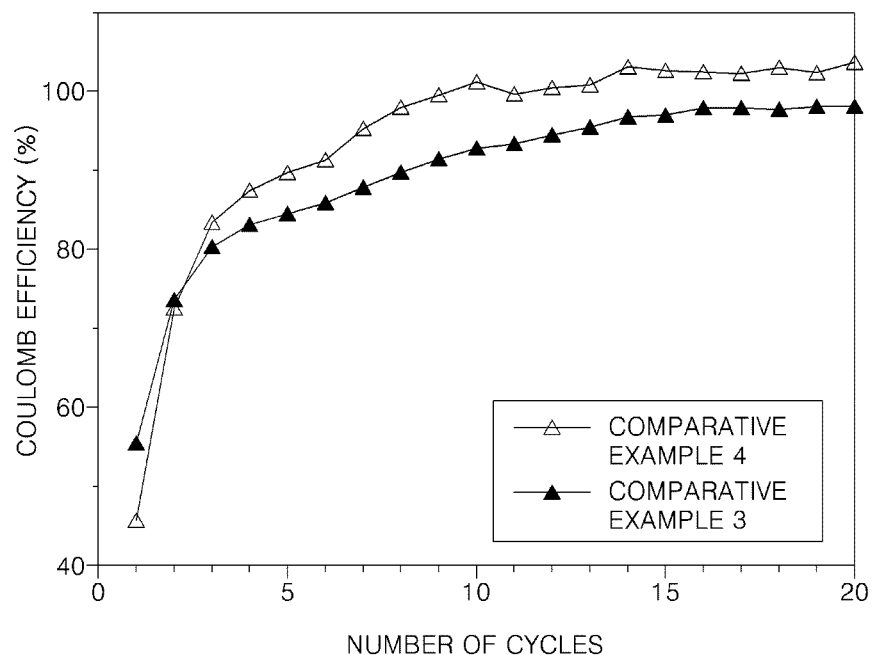
FIG. 13 is a graph of coulombic efficiency with respect to charging/discharging cycles of the half-cells including the anodes manufactured according to Comparative Examples 3 and 4.

The half-cells respectively including the anodes of Comparative Example 3 and Comparative Example 4 were subjected to 20 cycles of charging and discharging, at 0.1 C, to measure charge/discharge capacities according to the charging and discharging cycles. The results are shown in FIG. 12. In addition, the coulombic efficiency of each of the half-cells was measured, and the results are shown in FIG. 13. Referring to FIGS. 12 and 13, the battery characteristics were severely deteriorated in both cases, although the anode of Comparative Example 4, including polyethyleneimine binder, exhibited even worse characteristics. This result is attributed to the lack of the carbon nanotubes to provide electrical conducting pathways during charging and discharging.

Figure 14:
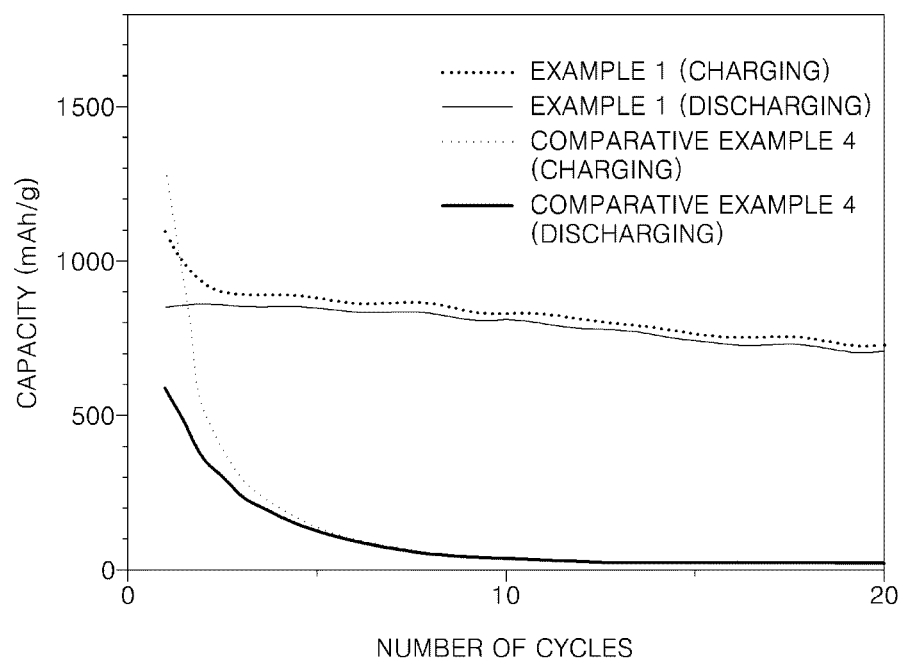
FIG. 14 is a graph of capacity with respect to charging/discharging cycles of the half-cells including the anodes manufactured according to Example 1 and Comparative Example 4.
Figure 15:
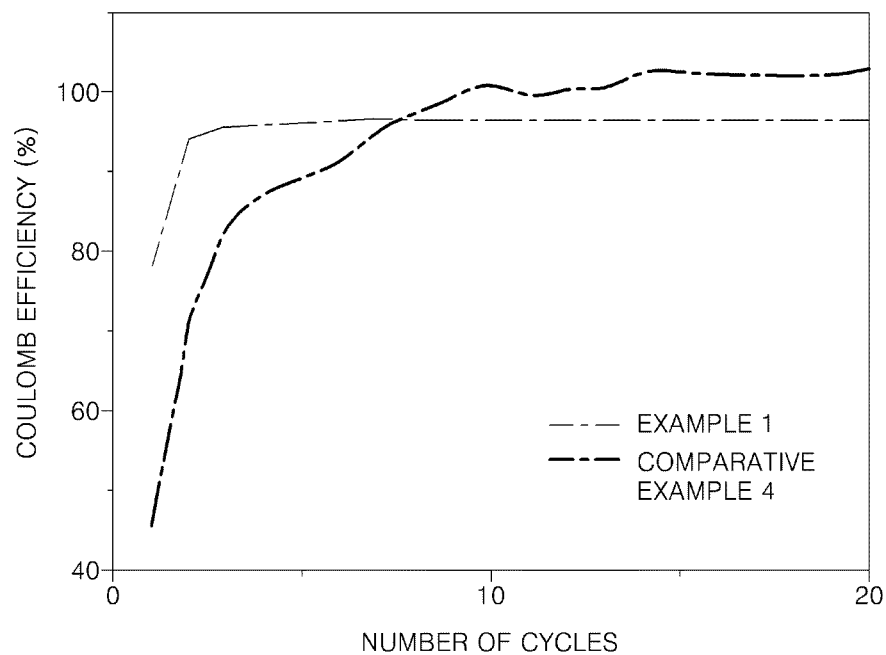
FIG. 15 is a graph of coulombic efficiency with respect to charging/discharging cycles of the half-cells including the anodes manufactured according to Example 1 and Comparative Example 4.

The half-cells respectively including the anodes of Example 1 and Comparative Example 4 were subjected to 20 cycles of charging and discharging, at 0.1 C, to measure charge and discharge capacities according to the charging and discharging cycles. The results are shown in FIG. 14. In addition, the coulombic efficiency of each of the half-cells was measured, and the results are shown in FIG. 15. Referring to FIGS. 14 and 15, it is obvious that, when the carbon nanotubes were not added, as in Comparative Example 4, the effect attainable by the use of the polyethyleneimine binder cannot be obtained. As described above, this result is attributed to the lack of the carbon nanotubes.

EXAMPLE 3

An anode was manufactured in the same manner as in Example 1, except that a mixture of Si, having an average particle size of 4 μm, and carbon nanotubes, in a ratio of 80%:20% by weight, was used.

EXAMPLE 4

An anode was manufactured in the same manner as in Example 1, except that a mixture of Si, having an average particle size of 4 μm and carbon nanotubes, in a ratio of 98%:2% by weight, was used.

EXAMPLE 5

An anode was manufactured in the same manner as in Example 1, except that polyaniline was used as the binder, instead of polyethyleneimine.

EXAMPLE 6

An anode was manufactured in the same manner as in Example 1, except that polythiophene was used as the binder, instead of polyethyleneimine.

The cycle lifetime characteristics of the anodes manufactured according to Examples 3 through 6 were measured in the same manner as in Example 1. As a result, the cycle lifetime characteristics of the anodes of Examples 1 through 6 were improved, as compared to the anodes manufactured according to Comparative Examples 1 through 4.

COMPARATIVE EXAMPLE 5

Si having an average particle diameter of 4 μm, a mixture of carbon nanotubes and natural graphite as the conducting agent, and polyethyleneimine as the binder were mixed in water, to prepare an anode active material composition in slurry form. Herein, the proportions of the anode active material, the conducting agent, and the binder were 55%, 30%, and 15%, respectively, by weight, excluding the weight of the water.

The anode active material composition was coated on a copper current collector and dried at 120° C. in a vacuum, for 2 hours, to manufacture an anode.

COMPARATIVE EXAMPLE 6

An anode active material including Si having an average particle diameter of 4 μm and carbon nanotubes, mixed in a ratio of 90:10% by weight, a mixture of polyethyleneimine, styrene butadiene rubber (RBS), and polyaniline sulfonic acid as the binder, and acetylene black as the conducting agent were mixed in water, to prepare an anode active material composition in slurry form. Herein, the mixing ratio of polyethyleneimine, styrene butadiene rubber (RBS), and polyaniline sulfonic acid was 10:50:40% by weight, and the proportions of the anode active material, the conducting agent, and the binder were 55%, 30%, and 15%, respectively, by weight, excluding the weight of the water.

COMPARATIVE EXAMPLE 7

A Si-anode active material including only Si having an average particle diameter of 4 μm, carbon nanotubes as a conducting agent, and a mixture of polyethyleneimine, and polyvinylidene fluoride were mixed in water, to prepare an anode active material composition in slurry form. Herein, the mixing ratio of polyethyleneimine and polyvinylidene fluoride was 10:90%, by weight, and the proportions of the anode active material, the conducting agent, and the binder were 50%, 35%, and 15%, respectively, by weight, excluding the weight of the water. The anode active material composition was coated on a copper current collector and dried at 120° C. in a vacuum, for 2 hours, to manufacture an anode.

COMPARATIVE EXAMPLE 8

An anode active material including Si having an average particle diameter of 4 μm and graphitized carbon fibers, natural graphite as the conducting agent, polyethyleneimine as a thickening agent, and polyethylene as the binder were mixed in water to prepare an anode active material composition in slurry form. Herein, the proportions of the anode active material, the conducting agent, the thickening agent, and the binder were 50%, 30%, 10%, and 10%, respectively, by weight, excluding the weight of the water. The anode active material composition was coated on a copper current collector and dried at 120° C. in a vacuum, for 2 hours, to manufacture an anode.

The cycle lifetime characteristics of the anodes manufactured according to Comparative Examples 5 through 8 were measured in the same manner as in Example 1. As a result, the cycle lifetime characteristics of the anodes of Comparative Examples 5 through 8 were inferior to those of the anodes manufactured according to Examples 1 through 6.

It should be understood that the exemplary embodiments described therein should be considered in a descriptive sense only and not for purposes of limitation. Descriptions of features or aspects within each exemplary embodiment should typically be considered as available for other similar features or aspects in other embodiments.

Although a few exemplary embodiments of the present teachings have been shown and described, it would be appreciated by those skilled in the art that changes may be made in these exemplary embodiments, without departing from the principles and spirit of the invention, the scope of which is defined in the claims and their equivalents.

What is claimed is:

1. An anode active material comprising primary nanoparticles comprising;
   a non-carbonaceous material bound with hollow carbon nanofibers, and
   a polymeric binder having an electron donor group, wherein
   the average particle size of the non-carbonaceous material is in a range of from about 10 nm to about 50 nm,
   the primary nanoparticles are agglomerated into secondary particles,
   the secondary particles have a maximum average particle size of about 50 μm, and
   the hollow carbon nanofibers are single-wall nanotubes, multi-wall nanotubes, coiled nanotubes, or a combination thereof.

2. The anode active material of claim 1, wherein a mixed ratio of the non-carbonaceous material and the hollow carbon nanofibers is in a range of from about 2:1 to about 50:1, by weight.

3. The anode active material of claim 1, wherein the non-carbonaceous material is selected from the group consisting of silicon (Si), a silicon oxide ($SiO_x$), ($0<x<2$), Si—Y (Y is selected from the group consisting of As, Sb, Bi, Cu, Ni, Mg, In, Zn, Ag, Al, and a combination thereof), and a combination thereof.

4. An anode comprising:
   a current collector; and
   an active material layer formed on the current collector, the active material layer comprising,
      an anode active material comprising primary nanoparticles comprising a non-carbonaceous material bound to hollow carbon nanofibers, the primary nanoparticles being agglomerated into secondary particles, and
      a polymeric binder having an electron donor group,
   wherein the average particle size of the non-carbonaceous material is in a range of from about 10 nm to about 50 nm and the secondary particles have a maximum average particle size of about 50 μm, and
   wherein the hollow carbon nanofibers are single-wall nanotubes, multi-wall nanotubes, coiled nanotubes, or a combination thereof.

5. The anode of claim 4, wherein an amount of the hollow carbon nanofibers is in a range of from about 2% to about 20%, by weight, based on the total weight of the active material layer.

6. The anode of claim 4, wherein the hollow carbon nanofibers are single-wall nanotubes, multi-wall nanotubes, coiled nanotubes, or a combination thereof.

7. The anode of claim 4, wherein the electron donor group is selected from the group consisting of an amino group, an amide group, a thiol group, a thioether group, and a combination thereof.

8. The anode of claim 4, wherein the polymeric binder comprises a polymer selected from the group consisting of polyethyleneimine, polyaniline, polythiophene, and a combination thereof.

9. The anode of claim 4, wherein the non-carbonaceous material is selected from the group consisting of silicon (Si), a silicon oxide ($SiO_x$) ($0<x<2$), Si—Y (Y is selected from the group consisting of As, Sb, Bi, Cu, Ni, Mg, In, Zn, Ag, Al, and a combination thereof), and a combination thereof.

10. A method of manufacturing an anode, the method comprising:
    milling a non-carbonaceous material and hollow carbon nanofibers in an organic solvent, to form a mixture;
    drying the mixture to prepare an anode active material comprising secondary particles comprising agglomerated primary nanoparticles, the primary nanoparticles comprising the hollow carbon fibers attached to the non-carbonaceous material;
    mixing the anode active material, a polymeric binder having an electron donor group, and a solvent to prepare an anode active material composition;
    coating the anode active material composition on a current collector; and
    drying the coated anode active material composition, to form the anode,
    wherein the average particle size of the non-carbonaceous material is in a range of from about 10 nm to about 50 nm and the secondary particles have a maximum average particle size of about 50 μm, and
    wherein the hollow carbon nanofibers are single-wall nanotubes, multi-wall nanotubes, coiled nanotubes, or a combination thereof.

11. The method of claim 10, wherein the milling of the non-carbonaceous material and the hollow carbon nanofibers is performed at a speed of from about 50 Hz to about 60 Hz.

12. The method of claim 10, wherein the milling of the non-carbonaceous material and the hollow carbon nanofibers is performed for from about 1 hour to about 2 hours.

13. The method of claim 10, wherein the organic solvent is an alcohol or an alkane.

14. The method of claim 10, wherein a mixed ratio of the non-carbonaceous material and the hollow carbon nanofibers is in a range of from about 2:1 to about 50:1, by weight.

15. A lithium battery comprising:
the anode of claim 4;
a cathode including a cathode active material; and
an electrolyte.

16. An anode active material composition comprising:
secondary particles comprising agglomerated primary nanoparticles, the primary nanoparticles comprising hollow carbon fibers attached to a silicon-based material; and
a polymeric binder having an electron donor group,
wherein the average particle size of the silicon-based material is in a range of from about 10 nm to about 50 nm and the secondary particles have a maximum average particle size of about 50 μm, and
wherein the hollow carbon nanofibers are single-wall nanotubes, multi-wall nanotubes, coiled nanotubes, or a combination thereof.

17. The anode active material composition of claim 16, wherein the silicon-based material is selected from the group consisting of silicon (Si); a silicon oxide ($SiO_x$), ($0<x<2$); Si—Y (Y is selected from the group consisting of As, Sb, Bi, Cu, Ni, Mg, In, Zn, Ag, Al, and a combination thereof); and a combination thereof.

18. The anode active material composition of claim 16, wherein:
the binder comprises a polymer selected from the group consisting of polyethyleneimine, polyaniline, polythiophene, and a combination thereof.

19. An anode active material comprising primary nanoparticles comprising
a non-carbonaceous material bound with hollow carbon nano fibers, and
a polymeric binder having an electron donor group selected from the group consisting of an amino group, an amide group, a thio group, a thioether group, and a combination thereof,
wherein the primary nanoparticles are agglomerated into secondary particles, and
wherein the average particle size of the silicon-based material is in a range of from about 10 nm to about 50 nm and the secondary particles have a maximum average particle size of about 50 μm.

20. The anode active material of claim 1, wherein the electron donor group is selected from the group consisting of an amino group, an amide group, a thiol group, a thioether group, and a combination thereof.

21. The method of claim 10, wherein the electron donor group is selected from the group consisting of an amino group, an amide group, a thiol group, a thioether group, and a combination thereof.

22. The anode active material composition of claim 16, wherein the electron donor group is selected from the group consisting of an amino group, an amide group, a thiol group, a thioether group, and a combination thereof.

* * * * *